(12) United States Patent
Garza

(10) Patent No.: US 9,072,998 B1
(45) Date of Patent: Jul. 7, 2015

(54) FILTERING SYSTEM FOR DUST MATERIAL TRANSFER

(71) Applicant: Jesus Jaime Garza, Mission, TX (US)

(72) Inventor: Jesus Jaime Garza, Mission, TX (US)

( * ) Notice: Subject to any disclaimer, the term of this patent is extended or adjusted under 35 U.S.C. 154(b) by 0 days.

(21) Appl. No.: 14/547,810

(22) Filed: Nov. 19, 2014

(51) Int. Cl.
*B01D 46/10* (2006.01)
*B01D 46/46* (2006.01)
*F17D 1/08* (2006.01)

(52) U.S. Cl.
CPC ............... *B01D 46/46* (2013.01); *F17D 1/088* (2013.01)

(58) Field of Classification Search
CPC ..... B01D 46/0086; B01D 46/46; F17D 1/088
USPC ................. 55/341.1–341.7, 361–382; 96/417
See application file for complete search history.

(56) References Cited

U.S. PATENT DOCUMENTS

| | | | | |
|---|---|---|---|---|
| 4,036,614 A | * | 7/1977 | DeMarco | 55/310 |
| 4,681,609 A | * | 7/1987 | Howeth | 55/302 |
| 6,350,290 B1 | * | 2/2002 | Nadeau | 55/302 |
| 2013/0067874 A1 | * | 3/2013 | Wang | 55/418 |

FOREIGN PATENT DOCUMENTS

| | | | | |
|---|---|---|---|---|
| CN | 203790733 U | * | 8/2014 | B01D 46/00 |
| CN | 203790733 U | * | 8/2014 | B01D 46/00 |

* cited by examiner

*Primary Examiner* — Thomas McKenzie

(57) ABSTRACT

A filtering system for dust material transfer is a replacement for current practices at land drilling sites and other operations involving silica dust. While silica dust is being transferred from a delivery truck to a customer tank, the customer tank's vent is connected to a hopper tank inlet duct. The hopper tank outlet is connected to the inlet of a dust filter. An visual indicator bag provides a visual indication of pressure within the system. A plurality of sensors, a plurality of flow control valves, a processor, a power source and a control panel provide means for electronic operation. A blower is connected to a cleaning inlet of the hopper tank in order to clean the hopper tank. Bypass ducts are connected from the hopper inlet duct straight to the dust filter in order to bypass the hopper tank during tank cleaning.

12 Claims, 4 Drawing Sheets

FILTERING SYSTEM FOR DUST MATERIAL TRANSFER

FIELD OF THE INVENTION

The present invention relates generally to dust filtering. More particularly, the present invention is a system for eliminating dust particle ejection during material transfer at a work site.

BACKGROUND OF THE INVENTION

Operations such as abrasive blasting, foundry work, stonecutting, rock drilling, quarry work and tunneling commonly utilize silica dust to facilitate the operation or create silica dust as a byproduct. Silica is a hazard for workers at job sites involving silica dust as breathing in the silica dust can cause serious, sometimes fatal illnesses including silicosis, lung, cancer, tuberculosis and chronic obstructive pulmonary disease, or COPD. Therefore, it is desirable to eliminate the possibility of workers breathing in silica dust as thoroughly as possible.

In order to transfer silica or other dust material from a delivery truck to a customer tank, a transfer duct is connected between an output from the supplier truck's reservoir and an input line on the customer tank. Silica dust is moved through the transfer duct into the customer tank, typically by an air pump or blower. The customer tank also has a vent in order to allow air to flow through the customer tank, as opposed to building pressure within the tank due to only having air forced into the tank with no outlet. Currently, during silica transfer, a dust bag is connected to the vent of the customer tank. The dust bag functions to provide a visual indication of pressure within the tank, and to mitigate expulsion of silica into the air in the job site environment by allowing air to travel through the dust bag while hampering the ability of silica to escape the bag through an open zipper. However, this process is imperfect, since silica dust is light and is easily picked up by air flowing through the bag—thus, some silica dust does escape from the bag. The present invention seeks to improve on this process by providing a permanent fixture on the job site which functions to much more effectively prevent silica dust from contaminating the air at a job site by filtering the air flow output from the customer vent during silica transfer.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a filtering system for dust material transfer. The present invention is intended to facilitate the elimination or significant reduction of dust particles from the air in an industrial environment where fine dust material is being transferred from a mobile supplier truck to a stationary customer tank at a job site. Ideally, the goal of the present invention is to achieve 100 percent dust reduction during material transfer. More particularly, the present invention is intended for use with land drilling operations, though the present invention is not limited to this application and may be used for any other relevant applications where the present invention may be useful. It should be noted that while the present invention is primarily intended for handling silica dust, any other applicable material may also be handled utilizing the present invention. In addition, the words silica, dust, and silica dust are used interchangeably herein.

Figure 1:
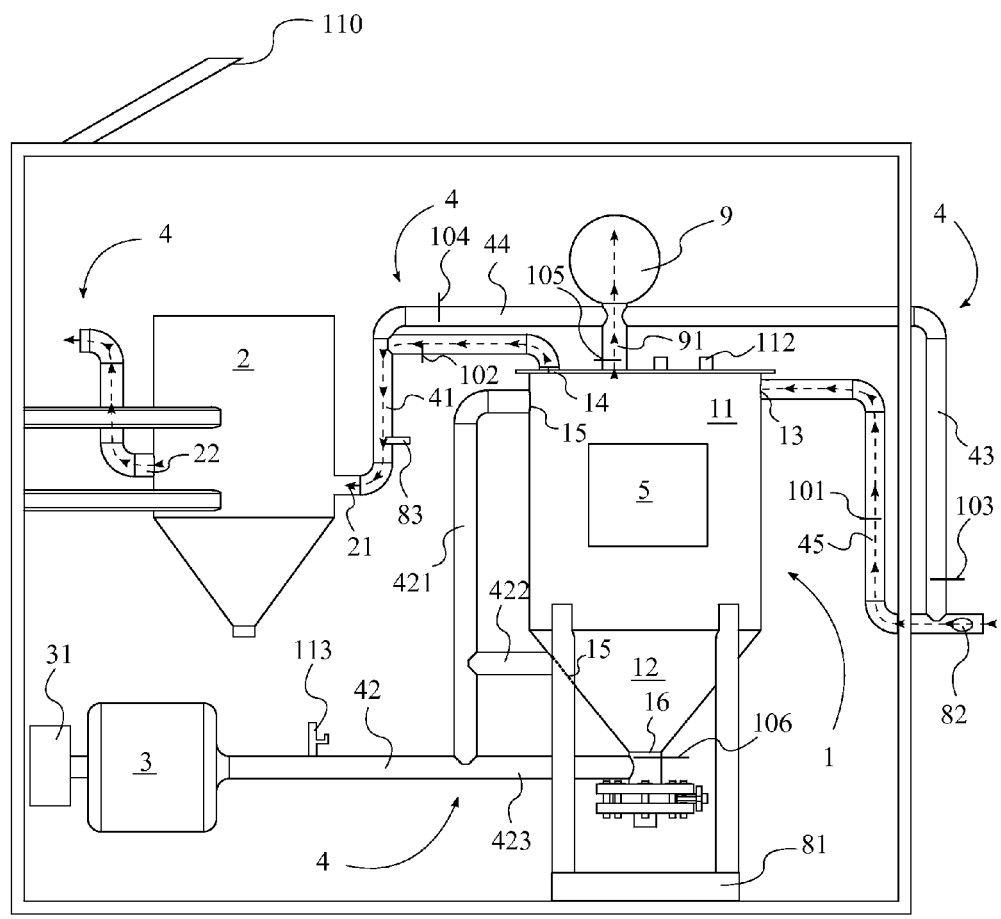
FIG. 1 is a diagram of the overall system of the present invention showing air flow during normal dust filtering operation.

Referring to FIG. 1, in general, the preferred embodiment of the present invention comprises a hopper tank 1, a dust filter 2, a blower 3, a plurality of ducts 4, a control panel 5, a power source 6, a processor 7, and a plurality of sensors 8. The vent of the customer tank is connected to the hopper tank 1, and exhaust flow from the customer tank vent flows through the hopper tank 1 to the dust filter 2, eliminating the problem of dust particulates being ejected into the air at the job site. The blower 3 is used to clean the hopper tank 1 when necessary.

In the preferred embodiment of the present invention, the hopper tank 1 is a hollow, metal tank with a cylindrical upper portion 11 and a conical lower portion 12, though the hopper tank 1 may comprise alternate configurations. The hopper tank 1 is ductedly connected to the dust filter 2 by a filter duct 41 from the plurality of ducts 4. The blower 3 is also ductedly connected to the hopper tank 1 by a blower duct 42 from the plurality of ducts 4, wherein the blower 3 moves air through the blower duct 42 into the hopper tank 1 in order to clean the hopper tank 1. The blower 3 is powered by a motor, preferably an electric motor 31 which is electrically connected to the power source 6. In an alternate embodiment, the blower 3 may be powered by a non-electric motor, such as, but not limited to a gasoline or diesel powered motor.

In the preferred embodiment, the dust filter 2 is any type of filter that is capable is receiving air flow with silica dust particles, and trapping the silica dust particles while allowing the air to traverse through the dust filter 2. The dust filter 2 comprises a filter inlet 21 and a filter outlet 22. Air with dust particles enters the dust filter 2 through the filter inlet 21, and clean, filtered air is expelled through the filter outlet 22.

Each connection between ducts, inlets or other components of the present invention through which air and/or dust is traversed should be understood to connect said components into fluid communication—that is, each connection allows fluid—in this case, air, and the fluid-like flow of silica dust— to traverse through the connection. Additionally, in the preferred embodiment each connection and component is hermetically sealed, so that no air or material can escape the components into the environment except through designated outlets.

In the preferred embodiment, the hopper tank 1 comprises a primary hopper inlet 13, a primary hopper outlet 14, a cleaning inlet 15 and a cleaning outlet 16. Multiple cleaning inlets 15 may be utilized. In the preferred embodiment, the primary hopper inlet 13 and the primary hopper outlet 14 are positioned on the cylindrical upper portion 11, and the cleaning outlet 16 is positioned on the conical lower portion 12.

Said outlets may be positioned in alternate locations, however, depending on configuration. The filter duct 41 is connected between the primary hopper outlet 14 and the filter inlet 21. A hopper inlet duct 45 from the plurality of ducts 4 is connected to the primary hopper inlet 13. The blower duct 42 is connected between the blower 3 and the cleaning inlet 15. In the preferred embodiment, the blower duct 42 comprises a first blower channel 421, a second blower channel 422, and a third blower channel 423. The first blower channel 421 is connected to a cleaning inlet 15 on the cylindrical upper portion 11, the second blower channel 422 is connected to a cleaning inlet 15 on the conical lower portion 12, and the third blower channel is connected to the cleaning outlet 16. This configuration serves to efficiently catch silica dust remaining within the hopper tank 1 and eject the silica dust through the cleaning outlet 16.

The preferred embodiment of the present invention further comprises a visual indicator bag 9, which is connected to the hopper tank 1 by an indicator bag channel 91. The visual indicator bag 9 provides a visual indication of pressure within the hopper tank 1 due to being in fluid communication with the hopper tank 1. While the vent of the customer tank is blowing air and dust into the primary hopper inlet 13, the pressure from the air flow inside the hopper tank 1 and the visual indicator bag 9 causes the visual indicator bag 9 to inflate. If the visual indicator bag 9 is not inflated during operation, the user knows that there is a problem with the system such as a clog and should take appropriate steps to rectify the situation.

The plurality of ducts 4 further comprises a first bypass duct portion 43 and a second bypass duct portion 44. The first bypass duct portion 43 is connected between the hopper inlet duct 45 and the indicator bag channel 91. The second bypass duct portion 44 is connected between the indicator bag channel 91 and the filter duct 41. The first and second bypass portions exist in order to bypass the hopper tank 1 when the hopper tank 1 is being cleaned while maintaining pressure in the visual indicator bag 9.

The preferred embodiment of the present invention additionally comprises a plurality of flow control valves 100 which are used to control the flow of air and silica dust through the present invention. The plurality of flow control valves 100 are operatively integrated within the plurality of ducts 4, wherein each of the plurality of control valves 100 function to impede or allow the flow of air/silica through the ducts. Any appropriate valve type may be utilized as desired, such as, but not limited to, ball valves, butterfly valves, or pinch valves.

In the preferred embodiment of the present invention, the plurality of flow control valves 100 comprises a hopper inlet valve 101, a hopper outlet valve 102, a first bypass valve 103, a second bypass valve 104, an indicator bag valve 105, and a cleaning outlet valve 106. Each valve serves to control flow through one of the ducts, inlets, outlets or other channels of the present invention. In the preferred embodiment, each of the flow control valves 100 is actuated electronically, so that the system may be shut down automatically if operational problems are detected.

The hopper inlet valve 101 is operatively integrated within the hopper inlet duct 45, or the primary hopper inlet 13. The hopper outlet valve 102 is operatively integrated within the filter duct 41, or the primary hopper outlet. The first bypass valve 103 is operatively integrated within the first bypass duct portion 43 and the second bypass valve 104 is operatively integrated within the second bypass duct portion 44. The indicator bag valve 105 is operatively integrated within the indicator bag channel 91. The cleaning outlet valve 106 is operatively integrated with the cleaning outlet 16, wherein the cleaning outlet valve 106 controls flow through the cleaning outlet 16. During normal operation, the hopper inlet valve 101, the hopper outlet valve 102, and the indicator bag valve 105 are open, while the first bypass valve 103, the second bypass valve 104, and the cleaning outlet valve 106 are closed.

The preferred embodiment of the present invention additionally comprises a plurality of check valves, also known as one-way valves. The check valves are used primarily to allow clean air from the blower to move into the hopper tank 1 through the blower duct 42 during a cleaning cycle, but prevent any flow from the hopper tank 1 toward the blower 3 through the blower duct 42. Preferably, the plurality of check valves comprises a first check valve, a second check valve, and a third check valve. The first check valve is operatively integrated within the first blower channel 421, the second check valve is operatively integrated within the second blower channel 422, and the third check valve is operatively integrated within the third blower channel 423. Additional check valves or any other type of valve may be operatively integrated within other ducts or components of the present invention not herein specified.

Figure 3:
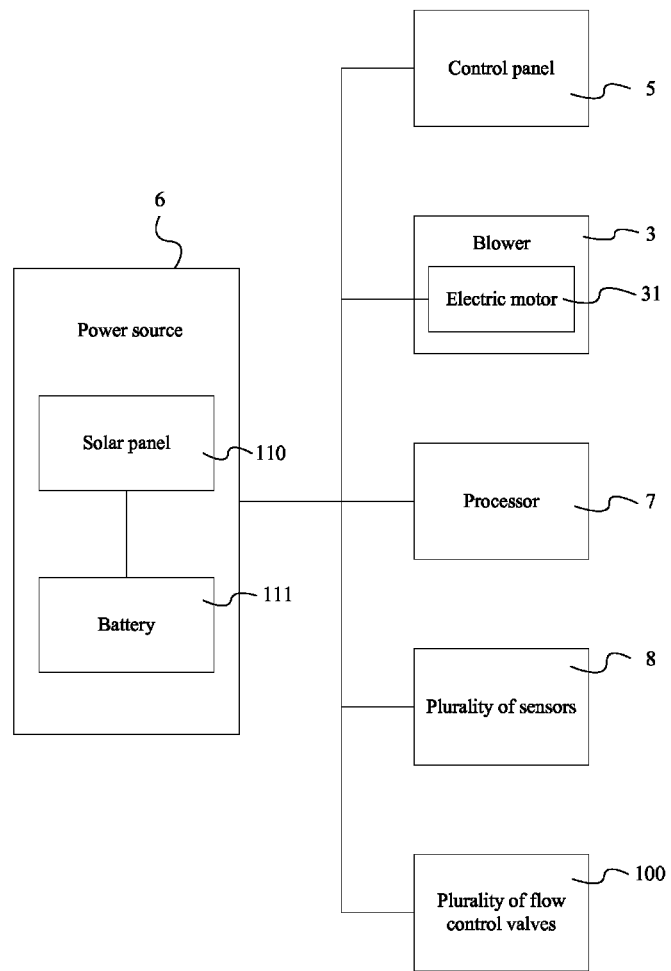
FIG. 3 is a diagram of the electrical connections between the power source and other components of the present invention.
Figure 4:
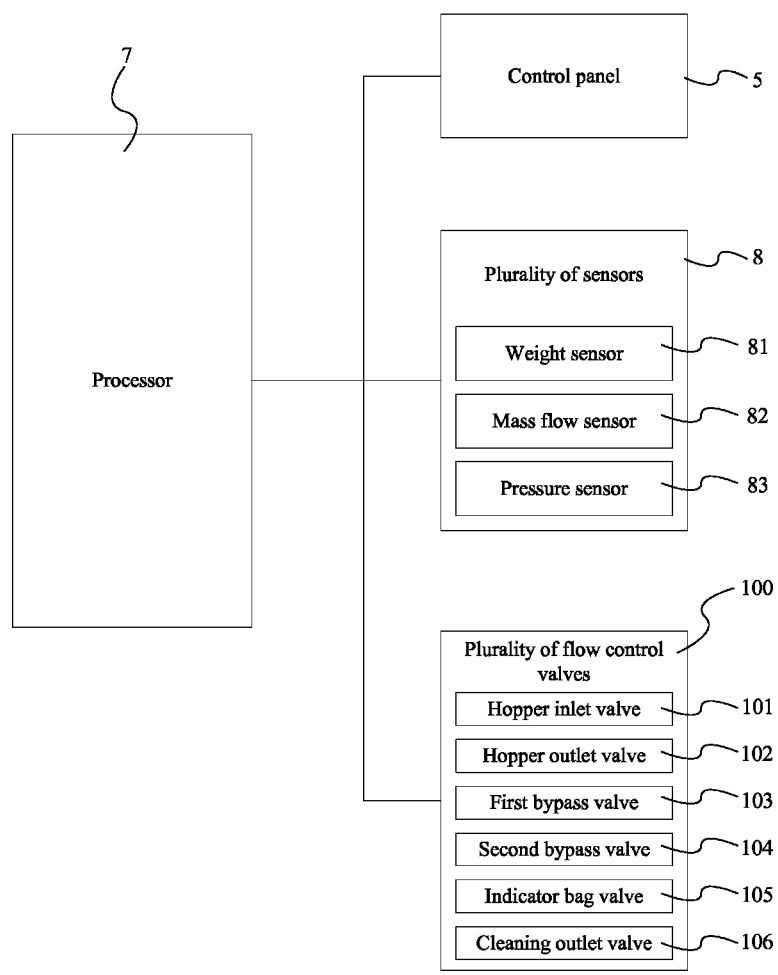
FIG. 4 is a diagram of the electronic connections between the processor and other components of the present invention.

Referring to FIG. 3, the power source 6 may be any appropriate source of electrical power, such as, but not limited to, a battery 111 or a hard connection to the electrical grid. The power source 6 is electrically connected to the control panel 5, the blower 3, and the processor 7. In the preferred embodiment, the power source 6 is also electrically connected to the blower 3 through the electric motor 31; that is, the power source 6 is electrically connected to the electric motor 31, which drives the blower 6. Alternatively, the blower 6 may be understood to comprise an integrated electric motor as opposed to a motor separate from the blower. Depending on the type of valve used, the power source 6 may also be connected to the plurality of control valves 100, or to various actuating components for controlling the flow control valves 100 as necessary. Additionally, the processor may be electronically connected to various other components requiring electrical inputs as dictated by the nature of the component. Referring to FIG. 4, the processor 7 is electronically connected to the control panel 5 and the plurality of sensors 8, and also to the plurality of flow control valves if applicable in various embodiments.

In the preferred embodiment of the present invention, the plurality of sensors 8 comprises a weight sensor 81, a mass flow sensor 82, and a pressure sensor 83, which measures air pressure within a duct or other enclosed chamber of the present invention. The plurality of sensors 8 may comprise additional sensors relevant to the operation of the present invention, such as, but not limited to, clog sensors, optical sensors, sound sensors, vibration sensors, moisture sensors, position sensors, temperature sensors, or other types of sensors.

The hopper tank 1 is positioned atop the weight sensor 81, wherein the weight sensor 81 measures the weight of the hopper tank 1. In the preferred embodiment, the mass flow sensor 82 is operatively integrated within the hopper inlet duct 45, wherein the mass flow sensor 82 measures the flow rate into the hopper tank 1 through the hopper inlet duct 45. However in alternate embodiments the mass flow sensor 82 may be operatively integrated in alternate locations, such as another of the plurality of ducts 4, within the hopper tank 1 or the dust filter 2, or multiple mass flow sensors may be utilized. The pressure sensor 83 is preferably located in the filter duct 41 leading into the dust filter 2, or the filter inlet 21.

The weight sensor 81 and the mass flow sensor 82 work together in order to alert the operator of the present invention when the customer tank is full. When the customer tank is full, no more silica can be deposited into the customer tank, and therefore silica begins to flow into the hopper tank 1 at a much higher rate. A significant increase in weight of the hopper tank 1 can signal that the customer tank is full, as well as a significant increase of flow rate into the hopper tank 1 detected by the mass flow sensor 82. The pressure sensor 83 also is useful for indicating a loss of air circulation.

In the preferred embodiment, the control panel 5 is positioned on the exterior of the hopper tank 1. However, the control panel 5 may be connected in any other location so long as electrical and electronic connections are preserved. The control panel 5 allows a user to operate the present invention and monitor the present invention during operation. The control panel 5 is preferably an electronic, touchscreen display, such as but not limited to an LED or LCD display, but the control panel 5 may also comprise physical buttons and gauges in alternate embodiments.

The preferred embodiment of the present invention additionally comprises a solar panel 110 and a battery 111 as part of the power source 6. The solar panel 110 is electrically connected to the battery 111 so that the solar panel 110 can charge the battery 111 during sunlit conditions.

The preferred embodiment of the present invention also comprises relief valves, as is common in applications where pressure build up can be a concern. A tank relief valve 113 is connected to and in fluid communication with the hopper tank 1, wherein the tank relief valve 113 enables pressure to be released from within the hopper tank 1. Similarly, a blower relief valve is operatively integrated with the blower duct 42, wherein the blower relief valve enables pressure to be released from within the blower duct 42.

Figure 2:
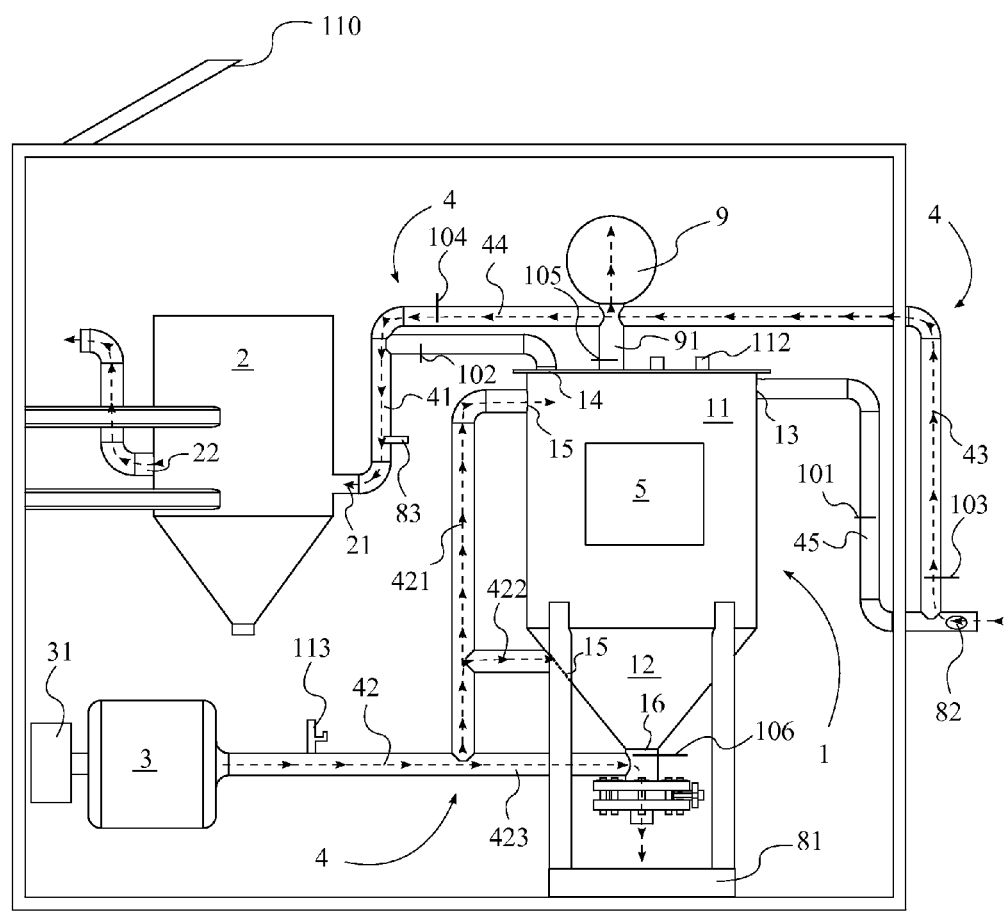
FIG. 2 is a diagram of the overall system of the present invention showing air flow during self-cleaning operation.

Referring to FIG. 2, occasionally it may be desirable to clean the hopper tank 1. For example, after multiple deliveries to the customer tank, or after each delivery, some silica dust will have been deposited into the hopper tank 1. Ideally, the hopper tank 1 should never be completely full. In order to perform a cleaning cycle, vented air from the customer tank's vent bypasses the hopper tank 1 and goes straight to the filter, while the blower 3 blows clean air through the hopper tank 1 in order to clean silica dust from the hopper tank 1. The blower 3 moves air into the hopper tank 1 through the cleaning inlet 15, and air (and silica dust) is ejected through the cleaning outlet 16. In order to perform a cleaning cycle, the hopper inlet valve 101, the hopper outlet valve 102, and the indicator bag valve 105 are closed, while the first bypass valve 103, the second bypass valve 104, and the cleaning outlet valve 106 are opened. This allows vented air from the customer tank to bypass the hopper tank 1 and go straight to the dust filter 2 while the blower 3 moves clean air through the hopper tank 1. During the cleaning cycle, the cleaning outlet 16 should be connected to the intake port of the customer tank in order to produce a closed loop system during the cleaning cycle. The purpose of the cleaning cycle is to remove silica dust from the hopper tank 1; silica dust cleaned from the hopper tank 1 must go somewhere, and it is desirable to prevent wasting product—therefore, the cleaned silica dust is transferred into the customer tank.

Although the invention has been explained in relation to its preferred embodiment, it is to be understood that many other possible modifications and variations can be made without departing from the spirit and scope of the invention as hereinafter claimed.

What is claimed is:

1. A filtering system for dust material transfer comprises:
a hopper tank;
a dust filter;
a blower;
a plurality of ducts comprising a filter duct, a blower duct, and a hopper inlet duct;
a control panel;
a power source;
a processor;
a plurality of sensors;
the plurality of sensors comprises a weight sensor and a mass flow sensor;
the hopper tank being ductedly connected to the dust filter by the filter duct from the plurality of ducts;
the blower being ductedly connected to the hopper tank by a blower duct from the plurality of ducts, wherein the blower moves air through the blower duct into the hopper tank in order to clean the hopper tank;
the hopper tank being positioned atop the weight sensor, wherein the weight sensor measures the weight of the hopper tank;
the power source being electrically connected to the control panel, the blower, and the processor;
the processor being electronically connected to the control panel and the plurality of sensors;
a plurality of flow control valves;
the plurality of flow control valves being operatively integrated within the plurality of ducts;
the power source being electrically connected to the plurality of sensors;
the power source being electrically connected to the blower through an electric motor;
the control panel being positioned on an exterior of the hopper tank; the power source comprises a solar panel and a battery;
the solar panel being electrically connected to the battery, wherein the solar panel charges the battery;
a tank relief valve being connected to and in fluid communication with the hopper tank, wherein the tank relief valve enables pressure to be released from within the hopper tank; and
a cleaning outlet located at the bottom of the hopper tank.

2. The filtering system for dust material transfer as claimed in claim 1 comprises:
the hopper tank comprises a primary hopper inlet, a primary hopper outlet, a cleaning inlet and a cleaning outlet;
the dust filter comprises a filter inlet; and
the filter duct being connected between the primary hopper outlet and the filter inlet.

3. The filtering system for dust material transfer as claimed in claim 2 comprises:
the hopper inlet duct from the plurality of ducts being connected to the primary hopper inlet.

4. The filtering system for dust material transfer as claimed in claim 2 comprises:
the blower duct being connected between the blower and the cleaning inlet.

5. The filtering system for dust material transfer as claimed in claim 2 comprises:
a cleaning outlet valve from a plurality of flow control valves; and
the cleaning outlet valve being operatively integrated with the cleaning outlet, wherein the cleaning outlet valve controls flow through the cleaning outlet.

6. The filtering system for dust material transfer as claimed in claim 1 comprises:
- a visual indicator bag; and
- the visual indicator bag being connected to the hopper tank by an indicator bag channel,
- wherein the visual indicator bag provides a visual indication of pressure within the hopper tank.

7. The filtering system for dust material transfer as claimed in claim 6 comprises:
- the visual indicator bag being in fluid communication with the hopper tank.

8. The filtering system for dust material transfer as claimed in claim 1 comprises:
- a first bypass duct portion, a second bypass duct portion, and the hopper inlet duct from the plurality of ducts;
- the first bypass duct portion being connected between the hopper inlet duct and an indicator bag channel; and
- the second bypass duct portion being connected between the indicator bag channel and the filter duct.

9. The filtering system for dust material transfer as claimed in claim 8 comprises:
- a plurality of flow control valves comprising a hopper inlet valve, a hopper outlet valve, a first bypass valve, a second bypass valve, an indicator bag valve;
- the hopper inlet valve being operatively integrated within the hopper inlet duct;
- the hopper outlet valve being operatively integrated within the filter duct;
- the first bypass valve being operatively integrated within the first bypass duct portion;
- the second bypass valve being operatively integrated within the second bypass duct portion; and
- the indicator bag valve being operatively integrated within the indicator bag channel.

10. The filtering system for dust material transfer as claimed in claim 1 comprises:
- the power source being electrically connected to a plurality of flow control valves.

11. The filtering system for dust material transfer as claimed in claim 1 comprises:
- the mass flow sensor being operatively integrated within the hopper inlet duct from the plurality of ducts, wherein the mass flow sensor measures the flow rate into the hopper tank through the hopper inlet duct.

12. The filtering system for dust material transfer as claimed in claim 1 comprises:
- a blower relief valve being operatively integrated with a blower duct, wherein the blower relief valve enables pressure to be released from within the blower duct.

* * * * *